United States Patent Office 2,751,883
Patented June 26, 1956

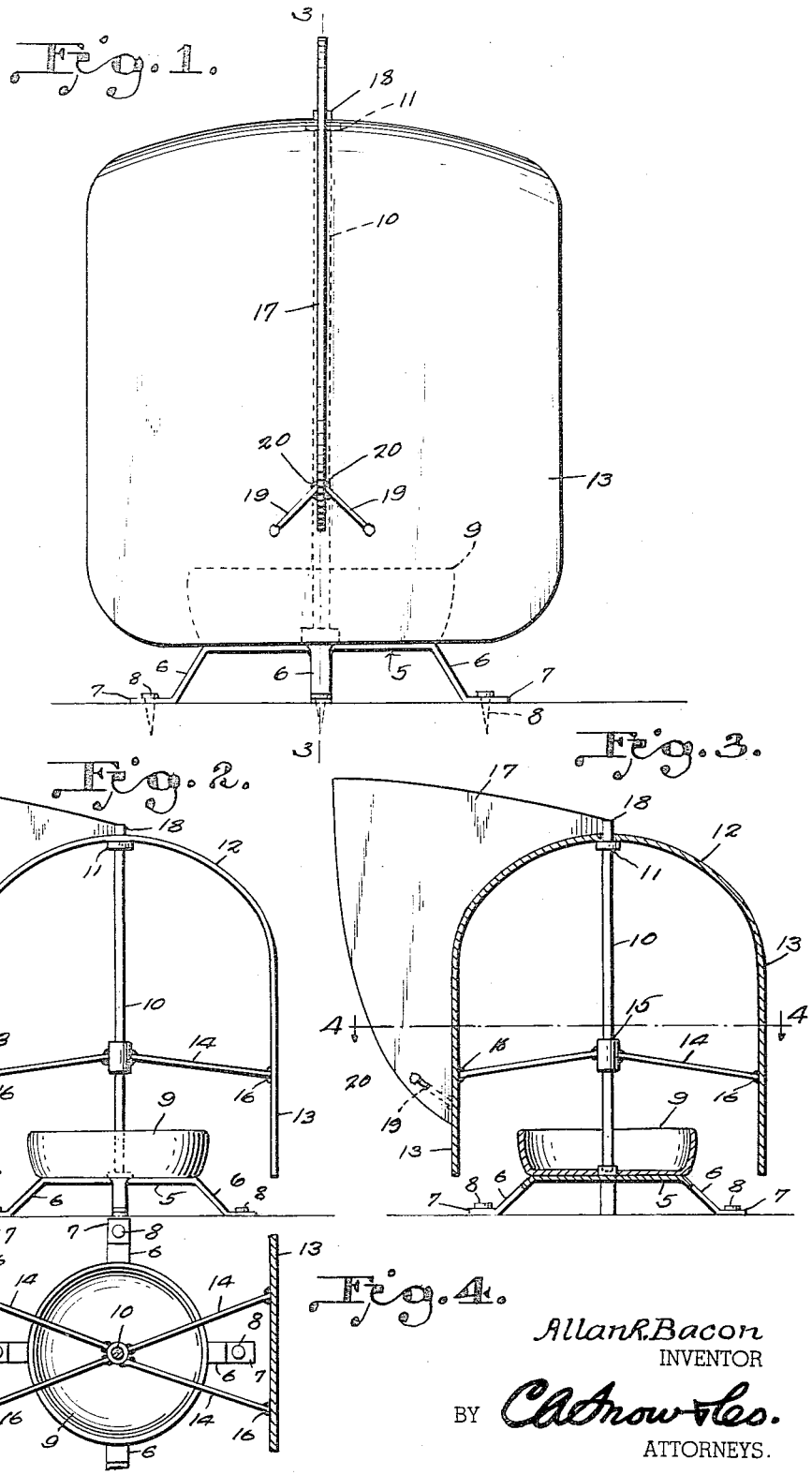

2,751,883
TWO-WAY LIVESTOCK FEEDER

Allan R. Bacon, McQueeney, Tex.

Application September 15, 1955, Serial No. 534,553

1 Claim. (Cl. 119—51)

This invention relates to a feeder designed primarily for the outdoor feeding of livestock.

The primary object of the invention is to provide a feeder of this character wherein the receptacle in which the feed is contained, will be guarded against the elements to prevent waste of the feed.

An important object of the invention is to provide a hood supported above the receptacle and rotatable to a position to protect the mineral or salt in the receptacle of the feeder, by the action of the wind against the weather vane, forming a part of the feeder.

Still another object of the invention is to provide a feeder wherein openings will be provided at opposite sides thereof so that livestock may gain access to the feed in the receptacle.

Other and further objects and advantages of the invention will be hereinafter described and the novel features thereof defined in the appended claims.

In the drawings:

Fig. 1 is a side elevational view of the feeder, constructed in accordance with the invention.

Fig. 2 is a front elevational view of the feeder.

Fig. 3 is a sectional view taken on line 3—3 of Fig. 1.

Fig. 4 is a sectional view taken on line 4—4 of Fig. 3.

Referring to the drawing in detail, the feeder comprises a stand 5 which is provided with legs 6 formed with feet 7 that have openings through which the spikes 8 are driven in securing the stand against accidental movement.

Mounted on the stand 5 is a receptacle 9 from which the post 10 rises, the lower end of the post being secured to the stand 5.

At the upper end of the post 5 is a collar 11 that provides a support for the inverted U-shaped hood 12 which comprises a wide length of sheet metal material bent upon itself to provide wide protecting skirts 13 that have their lower ends terminated at points below the receptacle 9, as better shown by Figs. 2 and 3 of the drawing.

Brace arms 14 have their inner ends welded to a collar 15 that rotates around the post 10. The other ends of said brace arms 14 are welded to the inner surface of the skirt 13, near the lower end thereof, as at 16. Thus it will be seen that due to this construction, openings are provided at opposite sides of the hood so that the livestock will have access to the mineral and salt in the receptacle of the feeder.

Secured to the outer surface of the hood 12, is a weather vane 17 which is secured at its upper end to the hood 12, at 18, the weather vane 17 having a curved edge curved to conform to the curvature of the hood, so that it fits snugly against the outer surface of the hood to which it is secured.

A pair of angular brace rods 19 are welded to the outer surface of the hood 12 at one side of the hood, the other ends of the rods 19 being welded to opposite sides of the weather vane 17, at 20, thereby providing a weather vane which is rigid and one which will hold the hood into the wind at all times to guard against the open sides of the hood being directed into the wind exposing the food contained in the receptacle, to the elements which would cause deterioration of the food.

From the foregoing it will be seen that due to the construction shown and described, I have provided a feeder especially designed for field or outdoor use wherein the open sides of the feeder through which livestock gain access to the receptacle of the feeder, will be maintained out of the direct path of wind and rain, thereby protecting the food in the receptacle 9.

Having thus described the invention, what is claimed is:

A feeder of the class described, comprising a leg supporting stand, a food receptacle mounted on said stand, a vertical post rising from the center of said stand, an inverted U-shaped hood rotatable on said post embodying a length of wide sheet metal material bent intermediate its ends forming an arcuate bight and a pair of vertical skirts with the skirts of said hood extending downwardly at opposite sides of said receptacle, terminating adjacent to the stand, providing opposed feeding openings whereby livestock may gain access to the feed in said receptacle through opposite sides of said hood, a collar fixed on said post engaging the lower side of said bight, a weather vane secured to said hood for effecting turning of the hood and guarding the feed within the receptacle, a second collar loose on said post, and outwardly divergent bracing bars fixed between said second collar and the lower portions of said skirts.

References Cited in the file of this patent

UNITED STATES PATENTS

| | | |
|---|---|---|
| 1,333,775 | Picotte | Mar. 16, 1920 |
| 1,911,921 | Nijveldt | May 30, 1933 |
| 2,682,255 | Kleeman | June 29, 1954 |